Jan. 13, 1942.   I. B. REMSEN   2,269,735
TRUCK
Filed Oct. 16, 1940   2 Sheets-Sheet 1
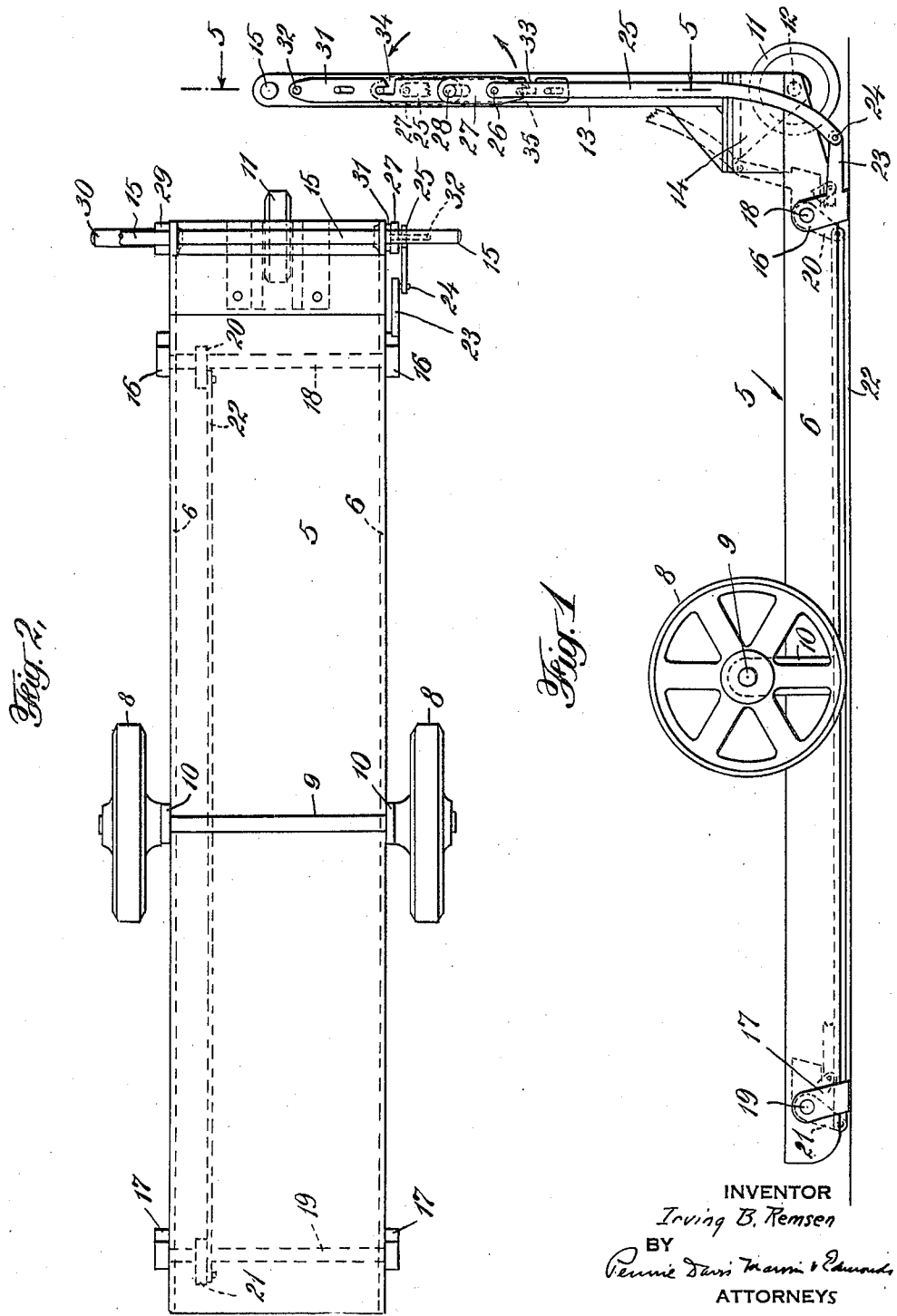
INVENTOR
Irving B. Remsen
BY
Pennie Davis Marvin & Edmonds
ATTORNEYS

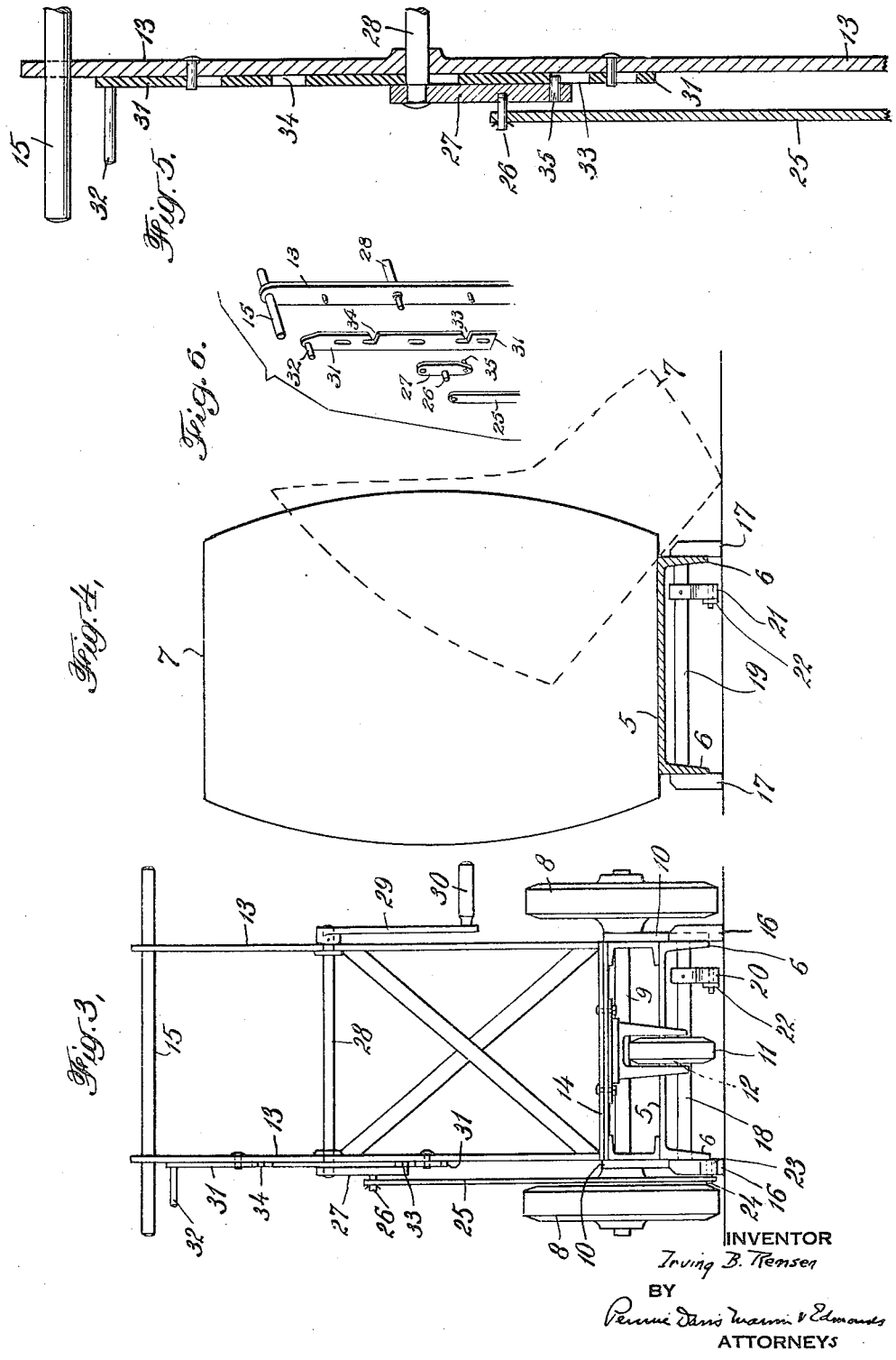

Patented Jan. 13, 1942

2,269,735

UNITED STATES PATENT OFFICE 2,269,735

TRUCK

Irving B. Remsen, Trenton, N. J., assignor to Magnetic Pigment Company, New York, N. Y., a corporation of New York Application October 16, 1940, Serial No. 361,335

3 Claims. (Cl. 280—50)

This invention relates to trucks designed particularly to permit easy handling and transportation of heavy containers such as barrels, boxes and crates. In factories and warehouses, it is frequently necessary to transport barrels and other containers which are relatively heavy, and two-wheeled vertical type trucks have been commonly used for that purpose. The use of such devices entails considerable heavy labor, and the trucks have a limited capacity, so that the labor cost is frequently high. Four-wheeled platform trucks are also used, but such equipment is usually provided with a high platform, so that the containers must be lifted. This requires the employment of at least two men in loading and unloading and necessarily increases the labor cost in the plant.

It is the object of the present invention to provide a truck capable of receiving a plurality of containers to facilitate transportation thereof, the truck being of simple construction and adapted to be loaded and unloaded with the minimum expenditure of labor and with the maximum safety in handling heavy containers.

Another object of the invention is the provision of means readily manipulable by the operator to prevent rolling of the truck during loading and unloading operations.

Another object of the invention is the provision of a truck which may be quickly loaded and unloaded and moved easily from place to place in any direction.

Other objects and advantages of the invention will be better understood by reference to the following specification and accompanying drawings, in which Fig. 1 is a side elevation of the truck;

Fig. 2 is a plan view thereof;

Fig. 3 is an end elevation of the truck;

Fig. 4 is a view partially in section illustrating the procedure in loading and unloading the truck;

Fig. 5 is a section on the line 5—5 of Fig. 1; and

Fig. 6 is an exploded perspective view showing the latch mechanism for holding the platform of the truck stationary during loading thereof.

The platform of the truck is constructed of a single channel member arranged with the flanges directed downwardly, thus affording a flat surface extending throughout the length of the truck. The size and weight of the channel member will depend upon the character and weight of the containers which it is designed to handle. Owing to the inherent strength of channel sections, such a truck platform may be of relatively light construction and nevertheless capable of supporting considerable loads, for example two thousand pounds or more. Obviously, heavier trucks designed to carry greater loads may be constructed in accordance with the principles of the invention. Since the flanges of the channel member may be relatively narrow in proportion to the web which affords the platform, the latter may be disposed so that it is relatively low and containers such as barrels, boxes and crates may be loaded onto the platform readily and with little expenditure of effort.

Preferably, the platform is mounted on suitable wheels which, when the truck is being moved, roll over the floor or other surface upon which the wheels may rest. However, during loading or unloading, it is desirable that the truck be stable, and for that purpose I provide means adapted to be moved into engagement with the floor by a simple manipulation to lift the channel member sufficiently so that the wheels are no longer in contact with the floor. When the truck is loaded, for example, it may be lowered readily until the wheels are in contact with the floor, whereupon it may be rolled in any direction. I have provided a simple and effective means whereby the operator of the truck may lift or lower it without substantial effort. The truck affords, therefore, means for handling heavy containers without strain or possible injury to the operator.

Referring to the drawing, the platform 5 is, as previously indicated, formed by the web of a channel member having flanges 6, which are directed downwardly, affording a smooth surface only slightly raised above the level of the floor. As indicated in Fig. 4, a barrel 7, for example, may be tilted so that its bottom rests against the edge of the platform and then moved readily onto the platform in which position it may be transported. The barrel may be discharged from the platform in a similar manner. The height of the platform is such that heavy barrels may be loaded and unloaded with relatively slight effort.

The channel member may be of any suitable length and is preferably supported when rolling on wheels 8 rotatably mounted on an axle 9 which is supported in journal members 10 which are secured to the sides of the channel member substantially midway of its length. A supplemental wheel 11 is supported on an axle 12 at one end of the truck. The three-wheeled support affords mobility for the truck, permitting it to be directed readily by the operator, but additional wheels may be employed if desired.

At one end of the truck, upright members 13 are secured by means of plates 14 to the flanges of the channel member, and are connected by a bar 15 affording an operating handle whereby traction force may be exerted to move the truck either forwardly or backwardly, as desired. Any other suitable means for applying traction force to the truck may be provided.

To facilitate loading and unloading operations, it is desirable that the truck be held stationary, thereby preventing accidents which might occur if the truck should move while heavy containers are being placed thereon or removed therefrom. To accomplish this purpose, I provide cams 16 and 17 secured to shafts 18 and 19, which extend through the flanges 6. Arms 20 and 21 are secured to the shafts 18 and 19 and are connected by a link 22 so that the cams may be operated in unison. One of the cams 18 is provided with an arm 23 which is pivotally connected at 24 to a link 25 extending along one of the upright members 13. The link 25 in turn is pivotally connected at 26 to a lever 27 secured to a shaft 28 extending through the upright members 13 and provided at the opposite side with a crank 29 and handle 30. A latch member 31 is slidably supported on one of the upright members 13 and is provided with L-shaped notches 33 and 34 to engage the lever 27 to prevent operation thereof. When the parts are in the full line position shown in Fig. 1, i. e., with the cams 16 and 17 engaging the floor to elevate the platform 5 sufficiently to raise the wheels 8 from the floor to stabilize the truck for a loading operation, and with the latch 31 in its lower position, the pin 35 projecting inwardly from the free end of the lever 27 lies within the closed, vertical part of the L-shaped notch 33 and prevents a swinging movement being imparted to the lever 27 and link 25 connected thereto. Thus as long as the latch member 31 remains in its lower position the cams 16 and 17 are locked in their floor-engaging position and the truck stabilized for loading. After the truck has been loaded, the latch 31 may be lifted by means of a handle 32 to bring the open, horizontal part of the L-shaped notch 33 opposite the pin 35, whereupon by turning the crank 29 the lever 27 may be swung to its upper, dotted line position to lift the cams 16 and 17 and permit the truck to be lowered until the wheels 8 engage the floor or other surface. After the lever 27 has been swung to its upper position it again may be locked against swinging movement by lowering the latch 31 to bring the pin 35 within the closed, vertical part of the L-shaped notch 34.

Thus, when the truck is to be loaded, the operator will turn the crank 29 so that the cams 16 and 17 engage the floor or other surface as indicated in Fig. 1 of the drawings. When the truck has been loaded, another turn of the crank 29 will lift the cams 16 and 17 sufficiently to allow the wheels 8 and 11 to engage the floor or other surface, whereupon the truck may be rolled in any direction. When the truck is to be unloaded, the platform will again be raised by actuating the cams 16 and 17, thus stabilizing the platform.

In utilizing the truck, it is not necessary to lift the entire weight of the container, and it has been found that barrels, drums, and heavy boxes and crates can be handled in the manner indicated with little of the effort and risk which are ordinarily incident to the handling of heavy merchandise of this character.

Various changes may be made in details of construction and arrangement of the parts and mechanism without departing from the invention or sacrificing the advantages thereof.

I claim:

1. In a truck for receiving and transporting relatively heavy articles and having a rolling support and cam members adapted to be moved into engagement with a surface supporting the truck to lift the rolling support from engagement with said surface and means for shifting the position of said cam members including a swinging member; means for locking the cam members comprising a projection extending from the swinging member, and a member having an L-shaped notch and movable to a position to bring the closed portion of the notch opposite the projection on the swinging member to lock the swinging member against swinging movement, or movable to a position to bring the open portion of the notch opposite the projection on the swinging member to permit swinging of said member.

2. In a truck for receiving and transporting relatively heavy articles and having a rolling support and cam members adapted to be moved into engagement with a surface supporting the truck to lift the rolling support from engagement with such surface and means for shifting the position of the cam members including a lever, a shaft for rotating the lever and connecting means between the lever and the cam members; means for locking the cam members comprising a projection extending from the swinging member, and a member having an L-shaped notch and movable to a position to bring the closed portion of the notch opposite the projection on the swinging member to lock the swinging member against swinging movement, or movable to a position to bring the open portion of the notch opposite the projection on the swinging member to permit swinging of said member.

3. In a truck for receiving and transporting relatively heavy articles and having a rolling support and cam members adapted to be moved into engagement with a surface supporting the truck to lift the rolling support from engagement with such surface and means for shifting the position of the cam members including a lever, a shaft for rotating the lever and connecting means between the lever and the cam members; a projection extending from said lever, and a sliding member having a pair of L-shaped notches positioned at opposite sides of the pivotal point of the lever, said sliding member being slidable, when the cam members are in their lowered position, to bring the closed portion of one of the L-shaped notches opposite the projection on the lever to lock the cam members in their lowered position, or to bring the open portion of that notch opposite the projection on the lever to permit the cam members to be moved to an upper position, and slidable, when the cam members are in an upper position, to bring the closed portion of the other L-shaped notch opposite the projection on the lever to lock the cam members in their upper position, or to bring the open portion of the other slot opposite said projection to permit the cam members to be moved to their lower position.

IRVING B. REMSEN.